Aug. 8, 1933.  E. L. GOLTRY  1,922,000
COMBINED SHACKLE AND BEARING MOUNTING FOR VEHICLE SPRINGS
Filed March 19, 1932
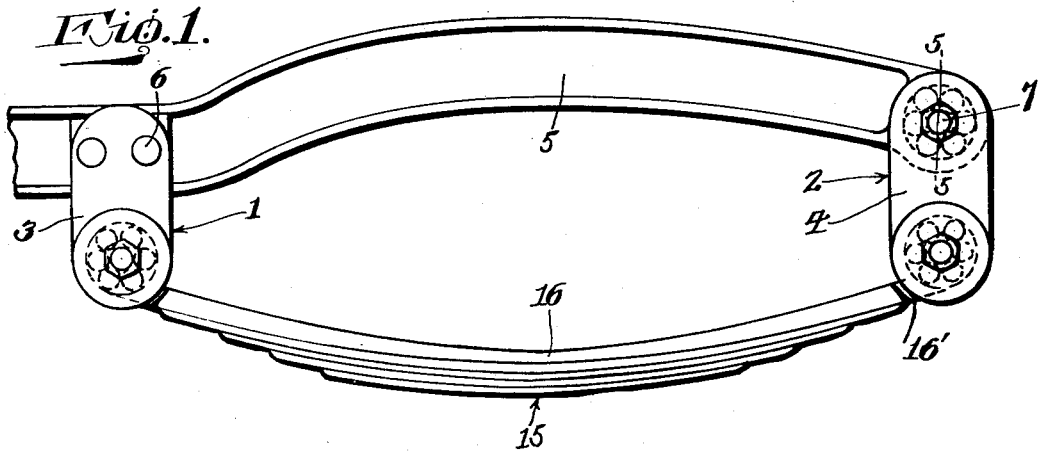
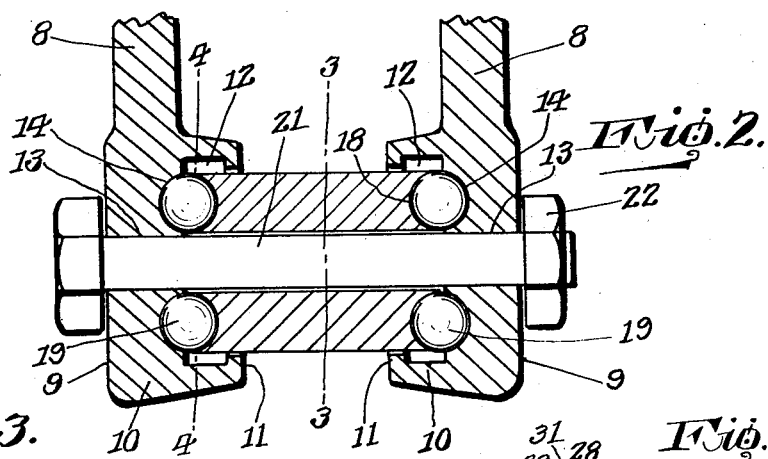
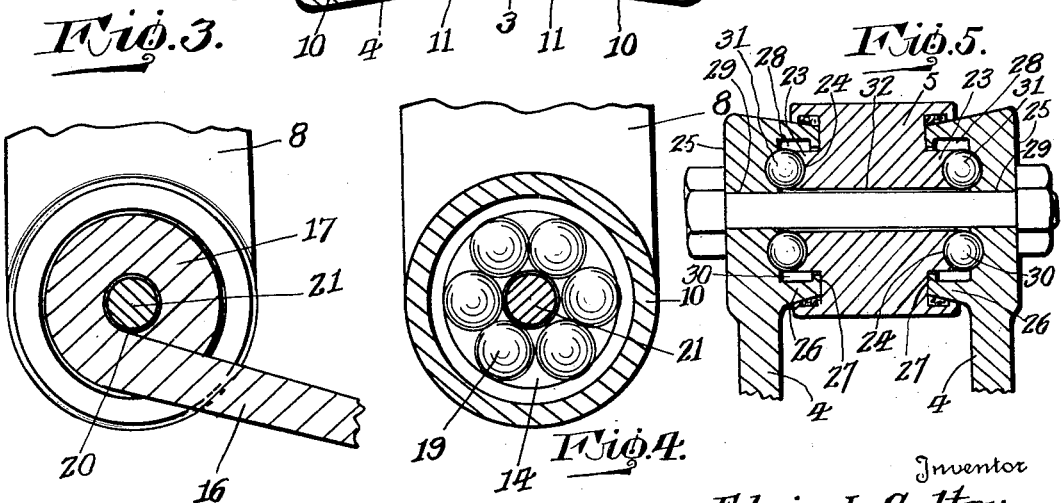
Inventor
Edwin L. Goltry
By Geo. P. Kimmel
Attorney Patented Aug. 8, 1933

1,922,000

UNITED STATES PATENT OFFICE 1,922,000

COMBINED SHACKLE AND BEARING MOUNTING FOR VEHICLE SPRINGS

Edwin L. Geltry, Red Oak, Iowa

Application March 19, 1932. Serial No. 599,993

11 Claims. (Cl. 267—54)

This invention relates to a combined shackle and bearing mounting for the ends of vehicle springs and has for its object to provide, a mounting of the class referred to which is simple in its construction and arrangement, strong, durable, compact, thoroughly efficient for the purpose intended, constructed and arranged to materially increase the life and to prevent friction and rattling of the spring and comparatively inexpensive to manufacture.

To the above ends essentially and others which may hereinafter appear, the invention consists of such parts and such combination of parts which fall within the scope of the invention as claimed.

In the drawing:—

Figure 1 is a side elevation looking towards the inner face of the front part of a side bar of the chassis of a vehicle, showing the adaptation with such bar of a combined shackle and bearing mounting in accordance with this invention.

Figure 2 is a fragmentary view in vertical section of the lower portion of a mounting element for either end of the spring.

Figure 3 is a section on line 3—3 Figure 2.

Figure 4 is a section on line 4—4 Figure 2.

Figure 5 is a section on line 5—5 Figure 1.

The mounting includes a mounting element for the forward end and for the rear end of the spring. The said elements are indicated at 1, 2 respectively. The element 1 includes a pair of stationary shackles 3 and element 2 a pair of pivoted shackles 4 which are of greater height than shackles 3. The lower portion of each pair of shackles are of like form. The construction of the lower portion of each pair of shackles will be as illustrated in Figures 2, 3 and 4.

The shackles of each pair are oppositely disposed and arranged in opposed spaced relation. The shackles 3 are arranged at opposite sides of a chassis side bar 5, depend from the latter and fixedly secured thereto by the holdfast means 6. The shackles 4 are arranged at the forward end of bar 5, at opposite sides of and depend from the latter. The shackles 4 are pivotally connected, as at 7 to bar 6. The lower ends of elements 1 and 2 align with each other.

Each shackle is in the form of a link 8 having a laterally enlarged lower portion 9 formed on its inner face with a collar 10 having an inturned annular flange 11 constituting a support. The collar 10 forms in connection with said lower portion a lubricant space 12. The enlarged lower portion 9 has an axial opening 13 and said portion has its inner face formed with an annular groove 14 which surrounds and is spaced from opening 13. The groove 14 provides a ball race.

The vehicle spring is indicated at 15, is of the laminated type and has the largest lamination 16 thereof formed with reduced end portion 16′. Each end portion 16′ of lamination 16 is of less width than the remaining part of the latter. Each end portion is bent upon itself at each end to form an annular terminus 17. Each side of the latter is formed with an annular groove 18 to provide a ball race. Each terminus 17 of the spring 15 is positioned between a pair of shackles whereby the grooves 18 therein will align with the grooves of such pair of shackles. Arranged in each pair of aligning grooves are the bearing balls 19. The flanges 11 on the collars 10 of the pair of shackles, between which a terminus 17 is arranged, surround and support the ends of the latter.

The opening 13 of one shackle of a pair aligns with the opening 13 of the other shackle of such pair, and such openings align with the opening 20 provided by that terminus 17 of the spring which is positioned between such pair of shackles. Extending through the aligning openings 13 and 20 is a headed pivoted bolt 21 secured to the pair of shackles by the nut 22.

With reference to Figure 5, the bar 5 is formed with oppositely disposed lateral, circular enlargements 23 each having a circular groove 24 to provide a ball race. The upper end 25 of each shackle 4 is laterally enlarged, and has formed on its inner face a collar 26 having an inturned annular flange 27 constituting a support. The collars 26 in connection with enlarged upper end 25 forms a lubricant space 28. The portion 25 has an axial opening 29 and its inner face provided with an annular groove 30 to provide a ball race and which opposes a groove 24, arranged in a pair of opposed grooves are bearing balls 31. The end 5 is formed with an opening 32 which aligns with openings 29 and extending through the aligning openings in the pivot bolt 7.

What I claim is:—

1. A combined shackle and bearing mounting for a vehicle spring comprising, the combination with a vehicle spring having annular terminals, of a pivoted outer pair and a stationary inner pair of shackles adapted to be connected to and depend from a side bar of the chassis of the vehicle, a collar integral with the inner face at the lower portion of each shackle and having an inturned annular flange constituting a support, each terminal of the spring extended into the collars of a pair of shackles and encompassed by the flanges on the collars, a pivot extending through the lower portion of each pair of shackles and an annular terminal, and bearing balls interposed between the sides of an annular terminal and the pair of shackles between which the terminal is positioned, said balls bearing directly against the sides of the terminals and the inner faces of the shackles.

2. A combined shackle and bearing mounting for a vehicle spring comprising, the combination with a vehicle spring having annular terminals, of a pivoted outer pair and a stationary inner pair of shackles adapted to be connected to and depend from a side bar of the chassis of the vehicle, a collar integral with the inner face at the lower portion of each shackle and having an inturned annular flange constituting a support, each terminal of the spring extended into the collars of a pair of shackles and encompassed by the flanges on the collars, a pivot extending through the lower portion of each pair of shackles and an annular terminal, bearing balls interposed between the sides of an annular terminal and the pair of shackles between which the terminal is positioned, each terminal having the sides provided with annular grooves, the inner faces of each pair of shackles formed with annular grooves aligning with the grooves of a terminal, and said aligning grooves providing races for said balls.

3. A combined shackle and bearing mounting for a vehicle spring comprising, the combination with a vehicle spring having annular terminals, of a pivoted outer pair and a stationary inner pair of shackles adapted to be connected to and depend from a side bar of the chassis of the vehicle, a collar integral with the inner face at the lower portion of each shackle and having an inturned annular flange constituting a support, each terminal of the spring extended into the collars of a pair of shackles and encompassed by the flanges on the collars, a pivot extending through the lower portion of each pair of shackles and an annular terminal, bearing balls interposed between the sides of an annular terminal and the pair of shackles between which the terminal is positioned, each terminal having the sides provided with annular grooves, the inner faces of each pair of shackles formed with annular grooves aligning with the grooves of a terminal, and said aligning grooves providing races for said balls, that part of each shackle provided with the collar being enlarged laterally.

4. In a combined shackle and bearing mounting for a vehicle spring, a mount for an end of the spring comprising, the combination with the spring having an annular end terminal, a pair of oppositely disposed spaced shackles having the lower portions thereof opposing the sides of such terminal, a collar integral with the inner face of each shackle and encompassing in spaced relation said terminal, an inwardly extending flange on each collar surrounding the terminal, bearing balls interposed between the sides of the terminal and the shackles, and a pivoted bolt extending through the shackles and terminals and attached to the shackles.

5. A vehicle spring mounting comprising the combination with a chassis side bar provided at one end with oppositely disposed laterally extending enlargements spaced from the top and bottom of the bar, said end being formed with an opening axially of and extending through the enlargements, and each of the latter having a circular groove providing a ball race, and a vehicle spring having annular terminals, each having each side thereof formed with a circular groove constituting a ball race, of an outer pair of parallel opposed shackles apertured at each end and each having its inner face at each end formed with an annular collar provided with an inwardly extending annular flange and a circular groove surrounded and spaced from the collar, said grooves in said shackles providing ball races, said flanges of said shackles encompassing one end terminal portion of the spring and said enlargements, bearing balls interposed between said terminal, enlargements and shackles and arranged in said races, pivot bolts extending through said shackles, terminal and enlargements, and an inner pair of shackles fixed at their upper ends to said bar and each aperture at its lower end, each having its inner face at its lower end formed with an annular collar provided with an inwardly extending annular flange and a circular groove surrounded and spaced from the collar, the groove in said inner shackles providing ball races, said flanges of said inner shackles surrounding the other terminal of said spring, bearing balls interposed between said other terminal and said inner shackles and arranged in the races provided by the grooves in said other terminal and inner shackles, and a pivot bolt extending through said other terminal and inner shackles.

6. A vehicle spring mounting comprising the combination with a chassis side bar provided at one end with oppositely disposed laterally extending enlargements spaced from the top and bottom of the bar, said end being formed with an opening axially of and extending through the enlargements, and each of the latter having a circular groove providing a ball race, and a vehicle spring having annular terminals, each having each side thereof formed with a circular groove constituting a ball race, of an outer pair of parallel opposed shackles apertured at each end and each having its inner face at each end formed with an annular collar provided with an inwardly extending annular flange and a circular groove surrounded and spaced from the collar, said grooves in said shackles providing ball races, said flanges of said shackles encompassing one end terminal portion of the spring and said enlargements, bearing balls interposed between said terminal, enlargements and shackles and arranged in said races, pivot bolts extending through said shackles, terminal and enlargements, a pivot for the other terminal of said spring, and stationary supporting means for the pivot for said other terminal, said means being secured to and depending from said bar.

7. A vehicle spring mounting comprising the combination with a vehicle spring having annular terminals, and a chassis side bar having one end apertured and provided with a pair of oppositely disposed laterally extending enlargements, of a pair of outer shackles having integral means on the inner faces thereof for encompassing in spaced relation one of the terminals of the spring and the said enlargements, said shackles being apertured at each end, bearing balls interposed between said shackles and such terminal and between said shackles and said enlargements, pivot bolts for connecting the shackles to said bar and said terminal, a pivot for the other terminal of said spring, and a pair of inner shackles fixed to said bar and supporting the pivot of said other terminal.

8. A vehicle spring mounting comprising the combination with the vehicle spring having annular terminals, and a chassis side bar having one end apertured and provided with a pair of oppositely disposed laterally extending enlargements, of a pair of outer shackles having integral means on the inner faces thereof for encompassing in spaced relation one of the terminals of the spring and the said enlargements, said shackles being apertured at each end, bearing balls interposed between said shackles and such terminal and between said shackles and said enlargements, pivot bolts for connecting the shackles to said bar and said terminal, a pair of inner shackles fixed at their upper ends of said bar and having the inner faces at the lower ends thereof provided with means encompassing in spaced relation the other terminal of said spring, a pivot extending through said other terminal and said inner shackles, and bearing balls interposed between said other terminal and said inner shackles.

9. In a vehicle spring mounting, in combination a vehicle spring having the terminals thereof of annular form, an outer and an inner pair of opposed shackles, each having its lower end provided with an aperture and its inner face formed with inwardly extending annular means surrounding said aperture and encompassing in spaced relation one side of an annular terminal, bearing balls interposed between the sides of said terminals and the inner faces of said shackles between said apertures and said means, pivot bolts for connecting said terminals to the shackles, means for pivotally connecting said outer shackles to a suspension means therefor, and means for fixedly securing said inner shackles to such suspension means.

10. In a vehicle spring mounting, in combination, a vehicle spring having the terminals thereof of annular form, a pivotally suspended outer pair of opposed shackles of like form, a suspended stationary inner pair of opposed shackles of like form, each of said shackles having its lower end provided with an aperture and its inner face formed with an inwardly extending collar surrounding in spaced relation said aperture, said collar being provided with an inwardly extending annular flange encompassing a terminal portion in proximity to one side of the latter, pivot bolts for connecting said shackles to said terminal portions, and bearing balls interposed between the sides of said terminal portions and the inner faces of said shackles between said apertures and collars.

11. In a vehicle spring mounting, in combination, a vehicle spring having the terminals thereof of annular form, a pivotally suspended outer pair of opposed shackles of like form, a suspended stationary inner pair of opposed shackles of like form, each of said shackles having its lower end provided with an aperture and its inner face formed with an inwardly extending collar surrounding in spaced relation said aperture, said collar being provided with an inwardly extending annular flange encompassing a terminal portion in proximity to one side of the latter, pivot bolts for connecting said shackles to said terminal portions, bearing balls interposed between the sides of said terminal portions and the inner faces of said shackles between said apertures and collars, and said terminal portions and inner faces of the shackles having grooves in which said balls are seated.

EDWIN L. GOLTRY.